(12) United States Patent
Kubo

(10) Patent No.: US 11,769,190 B2
(45) Date of Patent: Sep. 26, 2023

(54) IMAGE SEARCH APPARATUS, IMAGE SEARCH METHOD, NON-TRANSITORY RECORDING MEDIUM

(71) Applicant: GURUNAVI, Inc., Tokyo (JP)

(72) Inventor: Seiichiro Kubo, Tokyo (JP)

(73) Assignee: GURUNAVI, INC., Tokyo (JP)

( * ) Notice: Subject to any disclaimer, the term of this patent is extended or adjusted under 35 U.S.C. 154(b) by 907 days.

(21) Appl. No.: 16/682,913

(22) Filed: Nov. 13, 2019

(65) Prior Publication Data

US 2020/0151794 A1 May 14, 2020

(30) Foreign Application Priority Data

Nov. 14, 2018 (JP) ................................ 2018-213398
Sep. 4, 2019 (JP) ................................ 2019-161235

(51) Int. Cl.
*G06Q 30/0601* (2023.01)
*G06T 11/60* (2006.01)
*G06F 16/535* (2019.01)
*G06F 16/583* (2019.01)
*G06Q 10/02* (2012.01)
*G06F 16/538* (2019.01)

(52) U.S. Cl.
CPC ....... *G06Q 30/0625* (2013.01); *G06F 16/535* (2019.01); *G06F 16/538* (2019.01); *G06F 16/5854* (2019.01); *G06Q 10/02* (2013.01); *G06Q 30/0641* (2013.01); *G06T 11/60* (2013.01)

(58) Field of Classification Search
CPC ....... G06F 16/50; G06F 16/535; G06F 16/538
See application file for complete search history.

(56) References Cited

U.S. PATENT DOCUMENTS

| 10,154,192 B1* | 12/2018 | Sehn ...................... H04N 23/61 |
| 2014/0279068 A1* | 9/2014 | Systrom ............. G06Q 30/0269 705/14.73 |
| 2017/0109785 A1* | 4/2017 | Vidra ................. G06Q 30/0256 |
| 2019/0354638 A1* | 11/2019 | Kievit-Kylar ....... G06F 16/9038 |

OTHER PUBLICATIONS

"Instagram" Facebook, Inc. Available online at https://www.instagram.com/, Published on Oct. 6, 2010, 1 page.

* cited by examiner

*Primary Examiner* — Sanchita Roy
(74) *Attorney, Agent, or Firm* — Alleman Hall Creasman & Tuttle LLP

(57) ABSTRACT

An image search apparatus includes a search processing unit and a display processing unit. The search processing unit extracts one or more images that meet a search condition, from a plurality of images associated with user accounts. The display processing unit displays the one or more images extracted by the search processing unit in such a manner that types of user accounts corresponding to the images can be discriminated.

16 Claims, 9 Drawing Sheets

FIG.2

USER ACCOUNT INFORMATION (D1)

| USER ID | PASSWORD | ACCOUNT TYPE |
|---|---|---|
| USER A | aaaaa | PERSONAL ACCOUNT |
| USER B | bbbbb | BUSINESS ACCOUNT |
| USER C | ccccc | BUSINESS ACCOUNT |
| USER D | ddddd | PERSONAL ACCOUNT |
| USER E | eeeee | PERSONAL ACCOUNT |
| ⋮ | ⋮ | ⋮ |

FIG.3

IMAGE INFORMATION (D2)

| IMAGE ID | USER ID | TAG INFO | POSITION INFO |
|---|---|---|---|
| IMAGE A | USER C | CHEESE PLATE | RESTAURANT C |
| IMAGE B | USER C | CARBONARA | RESTAURANT C |
| IMAGE C | USER D | SHOES | — |
| IMAGE D | USER E | CARBONARA | RESTAURANT C |
| IMAGE E | USER B | — | HOTEL B |
| ⋮ | ⋮ | ⋮ | ⋮ |

FIG.4

| | | BUSINESS PROFILE INFORMATION | | | | D3 |
|---|---|---|---|---|---|---|
| USER ID | FACILITY NAME | TELEPHONE NO. | EMAIL ADDRESS | ADDRESS | RESERVATION WEB PAGE | |
| USER B | HOTEL B | 03-1234-5678 | bbb@mail.com | ..., TOKYO | http://hotel.com/bbb | |
| USER C | RESTAURANT C | 04-2345-6789 | ccc@mail.com | ..., TOKYO | http://gnavi.com/ccc | |
| USER F | RESTAURANT F | 05-3456-7890 | fff@mail.com | ..., AICHI | http://gnavi.com/fff | |
| USER G | SHOP G | 06-4567-8901 | ggg@mail.com | ..., OSAKA | http://shop.com/ggg | |
| USER H | RESTAURANT H | 07-5678-9012 | hhh@mail.com | ..., OSAKA | http://gnavi.com/hhh | |
| ... | ... | ... | ... | ... | ... | |

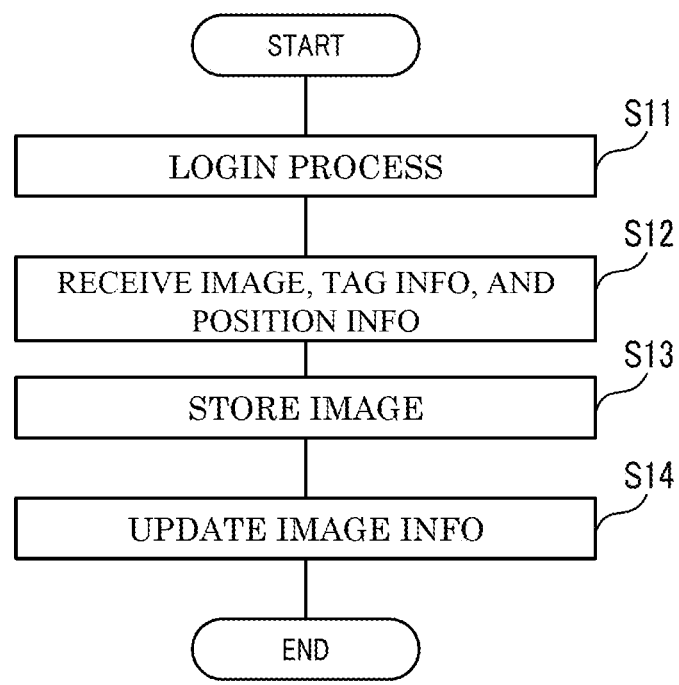

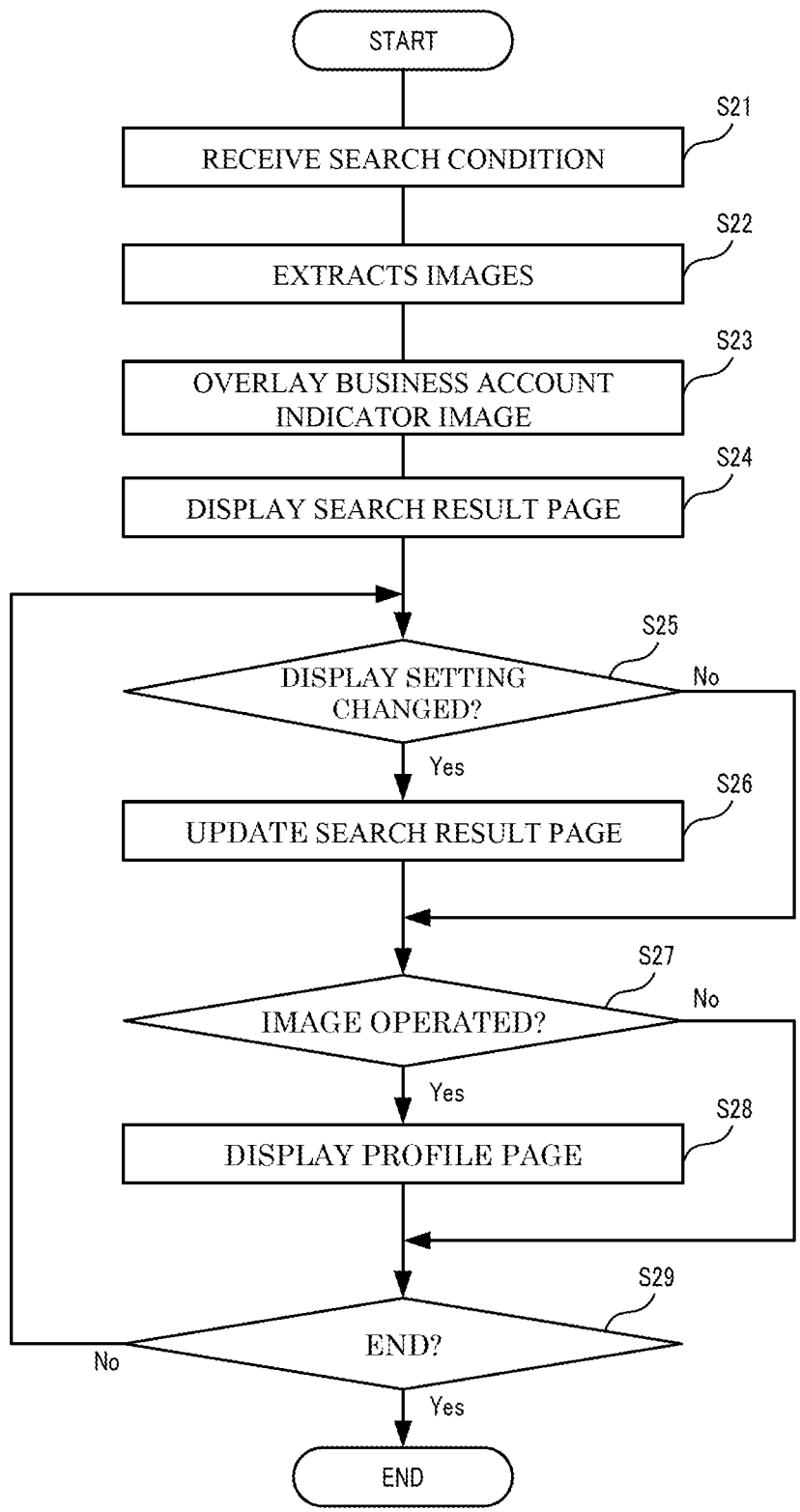

IMAGE SEARCH APPARATUS, IMAGE SEARCH METHOD, NON-TRANSITORY RECORDING MEDIUM

INCORPORATION BY REFERENCE

This application is based upon and claims the benefit of priority from the corresponding Japanese Patent Application No. 2018-213398 filed on Nov. 14, 2018, and No. 2019-161235 filed on Sep. 4, 2019, the entire contents of which are incorporated herein by reference.

BACKGROUND OF THE INVENTION

Field of the Invention

The present disclosure relates to an image search apparatus, an image search method, and a non-transitory recording medium.

Description of Related Art

There is known an image sharing service through which users can disclose images that the users themselves photographed to public users by uploading (posting) the images to a specific server on the Internet. The image sharing service provides an image search function for searching for a desired image among a plurality of images uploaded to the server. For example, when a user performs a search using "carbonara" as a keyword, a list of images to which a tag "carbonara" is attached, is displayed as a result of search.

SUMMARY OF THE INVENTION

An image search apparatus relating to a first aspect of the present disclosure includes a search processing unit and a display processing unit. The search processing unit extracts one or more images that meet a search condition, from a plurality of images associated with user accounts. The display processing unit displays the one or more images extracted by the search processing unit in such a manner that types of user accounts corresponding to the images can be discriminated.

An image search method relating to another aspect of the present disclosure causes one or more processors to execute a search step and a display step. In the search step, one or more images that meet a search condition are extracted from a plurality of images associated with user accounts. In the display step, the one or more images extracted in the search step are displayed in such a manner that types of user accounts corresponding to the images can be discriminated.

A non-transitory computer-readable recording medium relating to a further aspect of the present disclosure is a recording medium in which is recorded an image search program that causes one or more processors to execute: a search step of extracting one or more images that meet a search condition, from a plurality of images associated with user accounts; and a display step of displaying the one or more images extracted by the search step in such a manner that types of user accounts corresponding to the images can be discriminated.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 2 is a diagram showing an example of user account information which is used in the image search system according to the embodiment of the present disclosure;

FIG. 3 is a diagram showing an example of image information which is used in the image search system according to the embodiment of the present disclosure;

FIG. 4 is a diagram showing an example of business profile information which is used in the image search system according to the embodiment of the present disclosure;

FIG. 5 is a flowchart showing an example of a procedure of an upload process executed in an image search apparatus according to the embodiment of the present disclosure;

FIG. 6 is a flowchart showing an example of a procedure of an image search process executed in the image search apparatus according to the embodiment of the present disclosure;

DETAILED DESCRIPTION OF EMBODIMENTS

The following describes an embodiment of the present disclosure with reference to the accompanying drawings for the understanding of the present disclosure. It should be noted that the following embodiment is an example of a specific embodiment of the present disclosure and should not limit the technical scope of the present disclosure.

[Image Search System 1]

Figure 1:
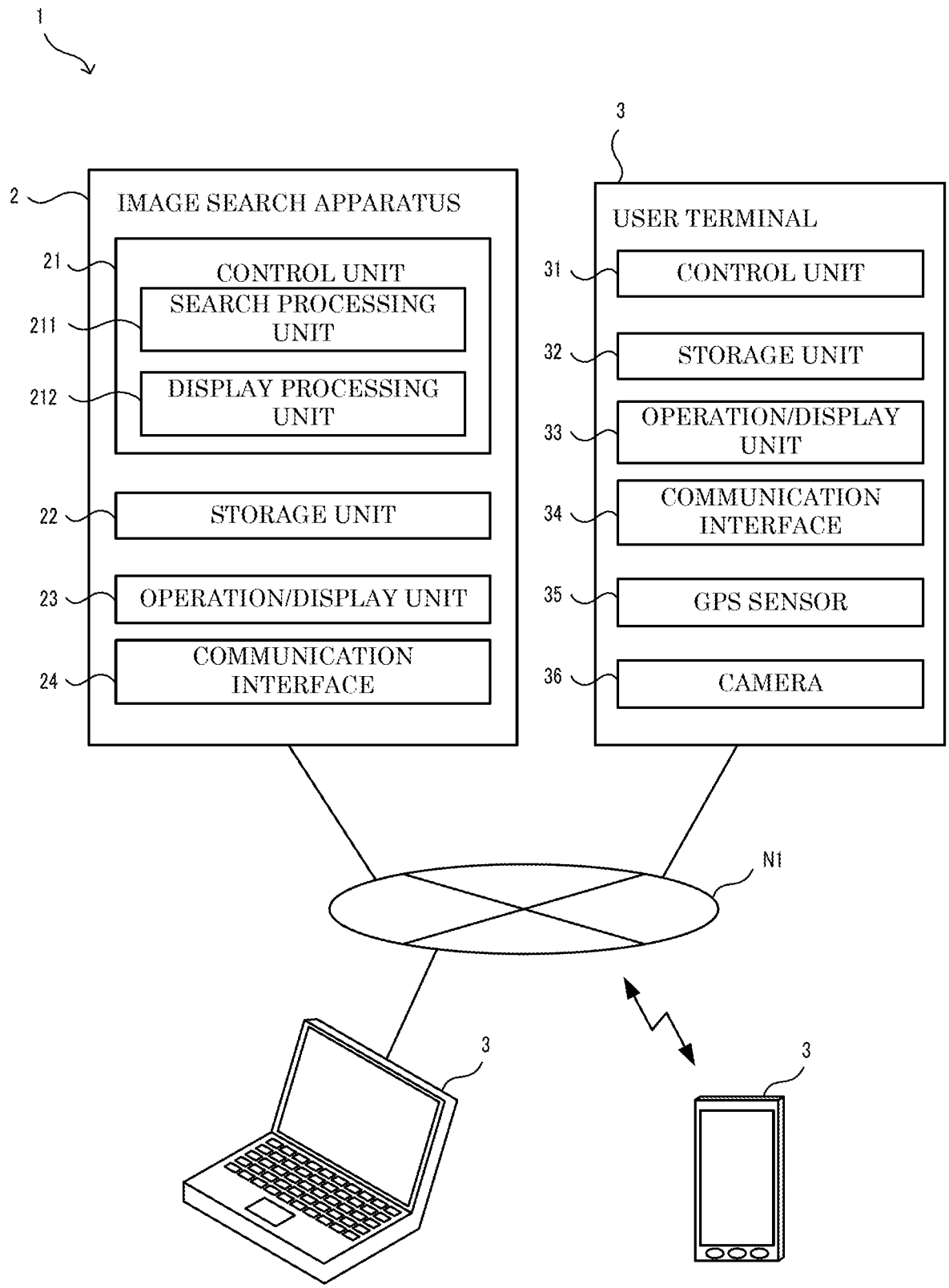
FIG. 1 is a block diagram showing a configuration of an image search system according to an embodiment of the present disclosure.

As shown in FIG. 1, an image search system 1 according to an embodiment of the present disclosure includes an image search apparatus 2 and one or more user terminals 3. The image search apparatus 2 and the user terminals 3 can communicate with each other via a communication network N1 such as the Internet, a LAN, a WAN, or a public telephone line.

The image search apparatus 2 is a server that provides an image sharing service through which users can disclose images that the users themselves photographed to public users. The image search apparatus 2 has an image search function for searching for an image(s) that meets a search condition, from among a plurality of images uploaded (posted) by a plurality of users.

Meanwhile, a user who wants to eat delicious carbonara may use the image search function of the image sharing service to search for a restaurant(s) that appears to provide delicious carbonara. However, when a search is performed using "carbonara" as a keyword, the displayed images will include not only images posted by restaurants, but also images posted by general users. As a result, when the user finds an image of delicious looking carbonara among the images displayed as a result of search, that image may have been photographed by a general user who cooked the carbonara. In this way, this is not an effective way for a user to search for a restaurant(s) providing delicious looking carbonara. On the other hand, the image search apparatus 2 of the present embodiment can easily discriminate a type of user account associated with each image displayed as a result of search.

[Image Search Apparatus 2]

As shown in FIG. 1, the image search apparatus 2 is a server including a control unit 21, a storage unit 22, an operation/display unit 23, and a communication interface 24. It is noted that the image search apparatus 2 is not limited to a computer, but may be a computer system in which a plurality of computers operate in cooperation with each other. In addition, various processes executed by the image search apparatus 2 may be distributedly executed by one or more processors.

The communication interface 24 connects the image search apparatus 2 to the communication network N1 through a wire or wirelessly, and performs a data communication with external devices such as the user terminals 3 via the communication network N1 in accordance with a predetermined communication protocol.

The operation/display unit 23 is a user interface including a display unit and an operation unit, wherein the display unit is, for example, a liquid crystal display or an organic EL display for displaying various types of information, and the operation unit is, for example, a mouse, a keyboard, or a touch panel for receiving operations.

The storage unit 22 is a nonvolatile storage unit such as a HDD (Hard Disk Drive) or a SSD (Solid State Drive) for storing various types of information. Specifically, the storage unit 22 stores data such as user account information D1, image information D2, and business profile information D3. Here, FIG. 2 is a diagram showing an example of the user account information D1. FIG. 3 is a diagram showing an example of the image information D2. FIG. 4 is a diagram showing an example of the business profile information D3.

As shown in FIG. 2, the user account information D1 is composed of one or more pieces of information which respectively correspond to one or more users registered in the image sharing service and each include information "user ID", "password", and "account type". The "user ID" is identification information for identifying the user. The "password" is authentication information for authenticating the user. The "account type" is an account type of the user (specifically, a personal account or a business account). The personal account is a user account of a general user. The personal account is an example of a "first-type user account" of the present disclosure. The business account is a user account of a business such as a restaurant, an accommodation, or an online shop. The business account is an example of a "second-type user account" of the present disclosure. The user account information D1 is consulted by the control unit 21 as necessary during an upload process (see FIG. 5) or an image search process (see FIG. 6) that are described below.

The image information D2 is composed of one or more pieces of information which respectively correspond to one or more images uploaded (posted) to the image search apparatus 2 and each include information "image ID", "user ID", "tag information", and "position information". The "image ID" is identification information for identifying the image. The "user ID" is identification information for identifying a user who uploaded the image. The "tag information" indicates a hash tag attached to the image. The hash tag is a character string that is attached to the image by the user as necessary when the image is uploaded. A plurality of hash tags may be attached to one image. It is noted that as another embodiment, a hash tag(s) may be automatically attached based on a result of image recognition performed by an AI (artificial intelligence). The "position information" indicates a location where the image was photographed, and is, for example, a geographical name or a facility name. The "position information" is specified or selected by the user when the image is uploaded. It is noted that as another embodiment, the position information may be automatically set based on Exif (Exchangeable image file format) information included in image data of the image. In addition, the position information may be automatically set based on the current position of a user terminal 3 when the image is uploaded from the user terminal 3 to the image search apparatus 2.

The business profile information D3 is composed of one or more pieces of information which respectively correspond to one or more business accounts and include information "user ID", "facility name", "telephone number", "email address", "address", and "reservation web page". The "user ID" is identification information for identifying the business account. The "facility name" is a name of a facility (for example, a restaurant or an accommodation) corresponding to the business account. The "telephone number" is a telephone number of the facility. The "email address" is an email address of the facility. The "address" is the address of the facility. The "reservation web page" is an address (for example, a URL) of a web page that receives online reservation of the facility. It is noted that the web page may be provided by another server (for example, a server of a dish information providing site that provides information about restaurants) that is different from the image search apparatus 2. The information, such as the "facility name", the "telephone number", the "email address", the "address", and the "reservation web page", included in the business profile information D3 is set by the user as necessary when the business account is registered in the image sharing service.

It is noted that as another embodiment, a part or whole of the user account information D1, the image information D2, and the business profile information D3 may be stored in another server to which the image search apparatus 2 is accessible via the communication network N1. In addition, the control unit 21 of the image search apparatus 2 may acquire various types of information from the server, and execute the processes such as the image search process (see FIG. 6) described below.

The storage unit 22 also stores data of a search page (not shown) on which search conditions are input. In addition, the storage unit 22 stores data of a search result page P1 (see FIG. 7, FIG. 9), a display setting page P2 (see FIG. 8), and a profile page P3 (see FIG. 10) that are described below, as well. It is noted that various "pages" displayed on the user terminals 3 in the present embodiment are "web pages" written by a mark-up language such as HTML and displayed via browser software.

Furthermore, the storage unit 22 stores control programs, such as an image search program, that causes the control unit 21 to execute the image search process (see FIG. 6) that is described below. For example, the image search program is recorded on a non-transitory computer-readable recording medium such as a CD or a DVD, read by a reading device (not shown) such as a CD drive or a DVD drive included in the image search apparatus 2, and stored in the storage unit 22.

The control unit 21 includes control equipment such as a CPU, a ROM, and a RAM. The CPU is a processor that executes various calculation processes. The ROM is a non-volatile storage unit in which control programs, such as a BIOS and an OS, for causing the CPU to execute the various calculation processes are stored in advance. The RAM is a volatile or nonvolatile storage unit for storing various types of information, and is used as a temporary storage memory (working area) for the various types of processes executed by the CPU. The control unit 21 controls the image search apparatus 2 by causing the CPU to execute the various types of control programs that have been stored in the ROM or the storage unit 22 in advance.

Specifically, as shown in FIG. 1, the control unit 21 includes various processing units such as a search processing unit 211 and a display processing unit 212. The control unit 21 functions as these processing units when it causes the CPU to execute the various processes in accordance with the image search program. It is noted that a part or whole of the processing units included in the control unit 21 may be formed as an electronic circuit such as an integrated circuit such as ASIC (Application Specific Integrated Circuit). It is noted that the image search program may be a program that causes a plurality of processors to function as the various processing units.

The search processing unit 211 extracts one or more images that meet the search condition(s), from a plurality of images associated with user accounts. For example, the plurality of images are images that were uploaded from the user terminals 3 to the image search apparatus 2 and stored in the storage unit 22. The images uploaded from the user terminals 3 to the image search apparatus 2 are associated with the user accounts as indicated in the image information D2 shown in FIG. 3. For example, the image A shown in FIG. 3 is associated with a user account whose user ID is "user C". In addition, the image C is associated with a user account whose user ID is "user D". For example, the search condition is set in accordance with a user operation input to a user terminal 3. The user of the user terminal 3 can input, as the search condition, a search keyword composed of a character string. The search processing unit 211 is configured to consult the image information D2 to extract one or more images associated with a hash tag that matches the keyword, from the plurality of images stored in the storage unit 22.

The display processing unit 212 displays the one or more images extracted by the search processing unit 211 in such a manner that the types of user accounts corresponding to the images can be discriminated. Specifically, the display processing unit 212 displays the images in such a manner that at least it is possible to determine whether each image is associated with a first-type user account (for example, the personal account) or a second-type user account (for example, the business account), wherein the first-type user account is different from the second-type user account. In the following description, it is supposed that the first-type user account is the personal account, and the second-type user account is the business account.

Figure 7:
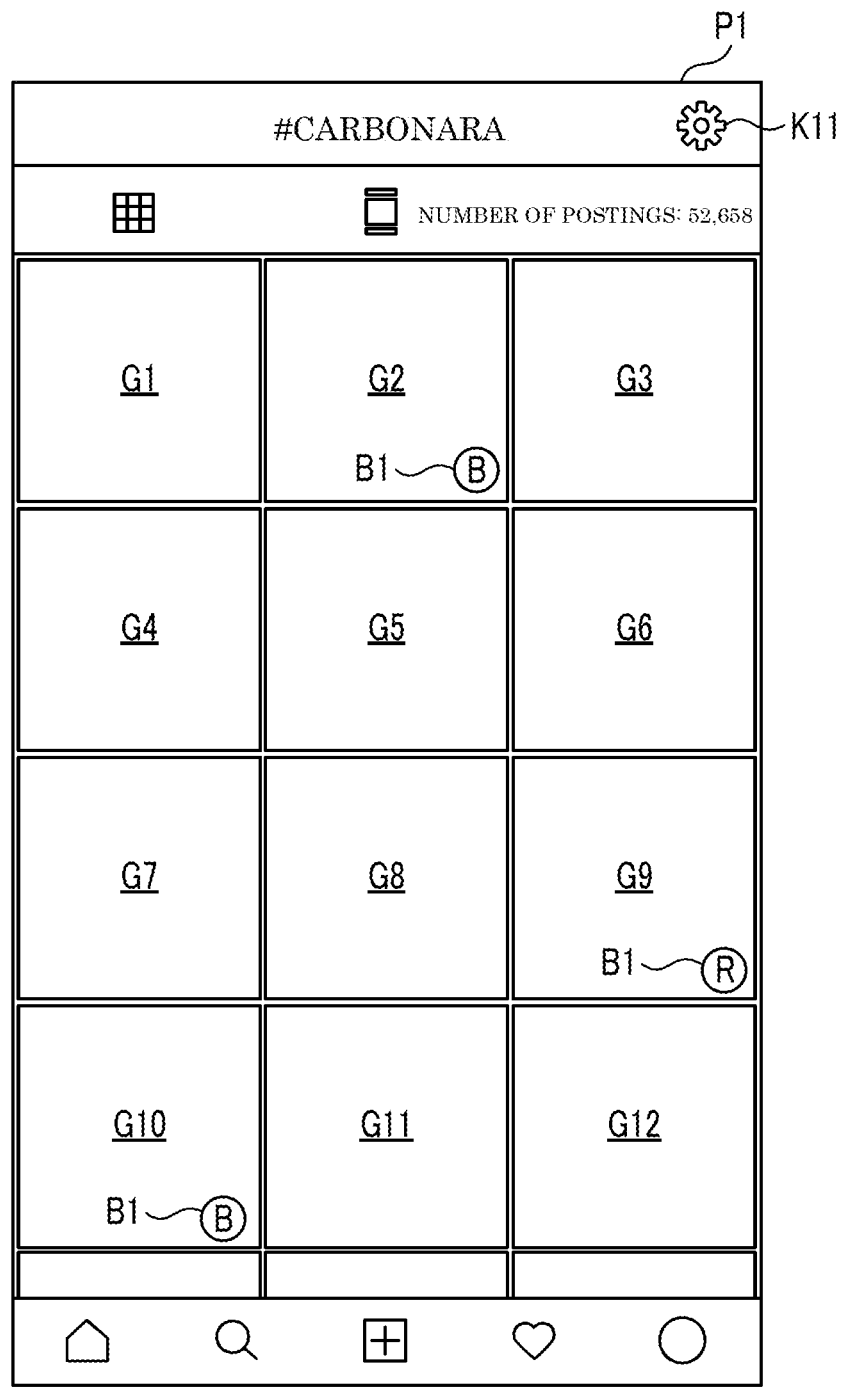
FIG. 7 is a diagram showing an example of a search result page displayed on a user terminal in the image search system according to the embodiment of the present disclosure.

For example, the display processing unit 212 generates data of the search result page P1 as shown in FIG. 7, and transmits the generated data to the user terminal 3 via the communication interface 24 and the communication network N1. This allows the search result page P1 to be displayed on the storage unit 33 of the user terminal 3. FIG. 7 shows an example of the search result page P1 displayed as a result of a search for which a character string "carbonara" was input as the search condition. In this example, 52,658 images with a hash tag "carbonara" attached thereto were extracted, and the user can freely browse the 52,658 images by performing a scroll operation in the search result page P1.

As in the search result page P1 shown in FIG. 7, a business account indicator image B1 may be overlaid, by the display processing unit 212, on images G2, G9, and G10 that are associated with the business account. This allows the user to easily distinguish between images G1, G3 to G8, G11, and G12 that are associated with the personal account and the images G2, G9, and G10 associated with the business account, among a plurality of images G1 to G12 displayed in the search result page P1. It is noted that the business account is an example of "a user account of a specific type" of the present disclosure. In addition, the business account indicator image B1 is an example of "an indicator image" of the present disclosure. That is, as shown in FIG. 7, the display processing unit 212 is configured to display, in the search result page P1 in which a plurality of images are displayed concurrently in alignment as the search result, the business account indicator image B1 overlaid on each image associated with the business account among the plurality of images.

It is noted that as another embodiment, the display processing unit 212 may display a plurality of images by overlaying a personal account indicator image on images associated with the personal account so that images associated with the personal account can be distinguished from images associated with the business account. In addition, the display processing unit 212 may display, in different sizes, images associated with the personal account and images associated with the business account (for example, display them such that the images associated with the business account are larger in size than the images associated with the personal account) so that images associated with the personal account can be distinguished from images associated with the business account. In addition, the display processing unit 212 may display, in different colors or thicknesses of the contour line, images associated with the personal account and images associated with the personal account so they can be distinguished from each other.

Figure 8:
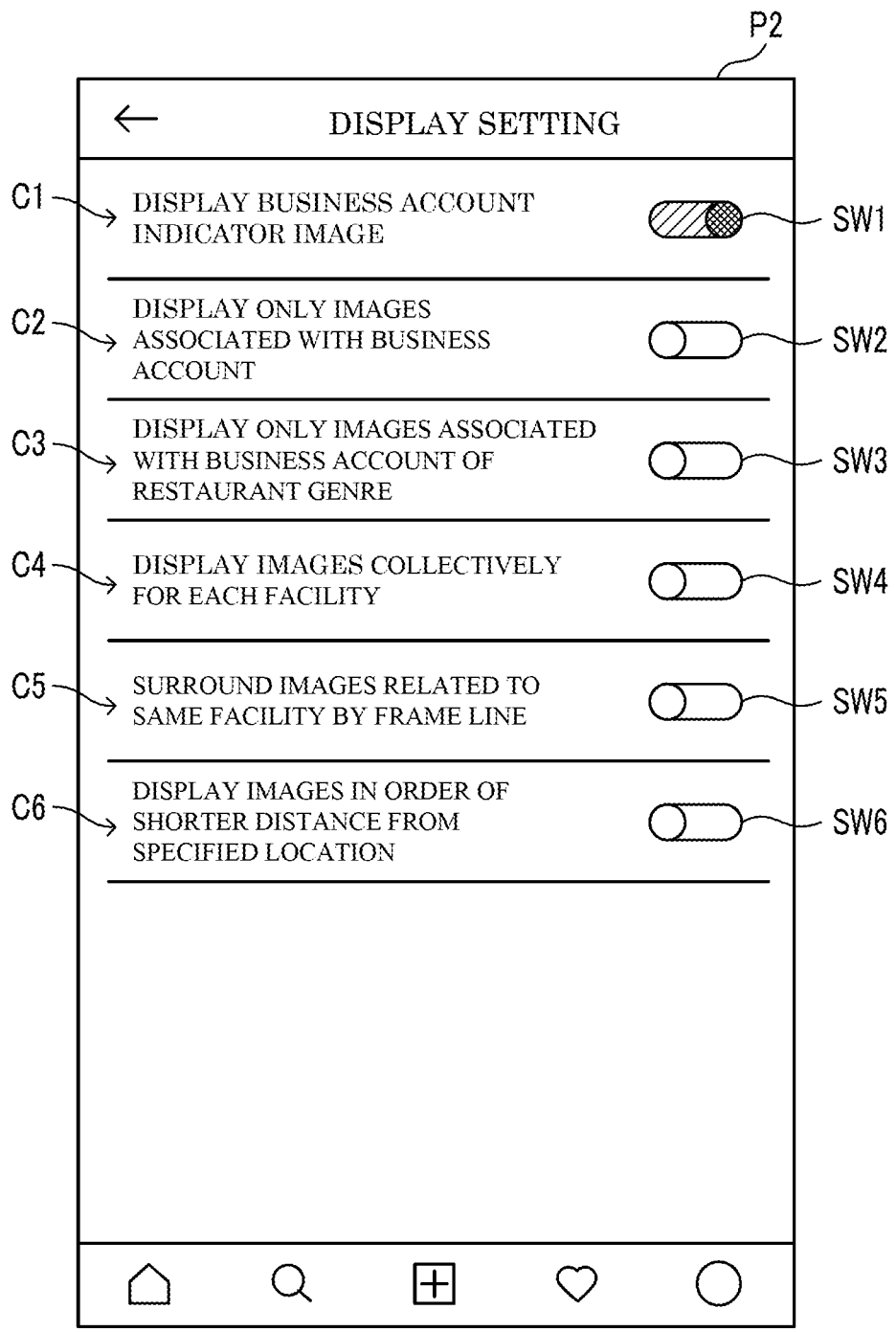
FIG. 8 is a diagram showing an example of a display setting page displayed on the user terminal in the image search system according to the embodiment of the present disclosure.

The display processing unit 212 may switch a mode of displaying the images associated with the business account between a first display mode and a second display mode in accordance with a user input, wherein in the first display mode, the business account indicator image B1 is overlaid, and in the second display mode, the business account indicator image B1 is not overlaid. For example, the display processing unit 212 may switch the mode of displaying the images associated with the business account between the first display mode and the second display mode in accordance with an operation of a switch key SW1 included in a display setting page P2 shown in FIG. 8. It is noted that the display setting page P2 shown in FIG. 8 is displayed when a display setting key K11 included in the search result page P1 is operated. This allows the user to hide the business account indicator image B1 as necessary to improve the visibility of the images in the search result page P1.

In response to a predetermined operation (for example, a tapping, a clicking, or a long-pressing) performed on the business account indicator image B1, the display processing unit 212 may display information (for example, a facility name or an address) concerning a user account (namely, the business account) corresponding to the images on which the business account indicator image B1 is overlaid. For example, when a long-pressing is detected on a business account indicator image B1 overlaid on an image associated with the business account, the display processing unit 212 may pop-up display the facility name and the address of the facility corresponding to the business account. This allows the user to easily recognize the facility name and the address of the facility corresponding to the business account.

The display processing unit 212 may display the images associated with the business account in preference to the images associated with the personal account. For example, when a switch key SW2 included in the display setting page P2 shown in FIG. 8 is set to ON, the display processing unit 212 displays, in the search result page P1, only the images associated with the business account. Alternatively, the display processing unit 212 may display, in the search result page P1, the images associated with the business account at a higher position (namely, at a position closer to the top of the page) than the images associated with the personal account. This allows the user to find a desired facility more easily.

The display processing unit 212 may display the images associated with the business account in such a manner that the genres of business account can be discriminated. For example, the display processing unit 212 may overlay, as a business account indicator image corresponding to a first genre (for example, a restaurant genre), a predetermined first genre indicator image on images associated with a business account of the first genre. In addition, the display processing unit 212 may overlay, as a business account indicator image corresponding to a second genre (for example, an accommodation genre), a predetermined second genre indicator image on images associated with a business account of the second genre, wherein the second genre indicator image is different from the first genre indicator image. This allows the user to find a desired facility easily.

The display processing unit 212 may display images associated with a business account of a specific genre (for example, the restaurant genre) in preference to images associated with business accounts of the other genres (for example, the accommodation genre). For example, when a switch key SW3 included in the display setting page P2 shown in FIG. 8 is set to ON, the display processing unit 212 displays, in the search result page P1, only the images associated with the business account of the restaurant genre. Alternatively, the display processing unit 212 may display, in the search result page P1, the images associated with the business account of the restaurant genre at a higher position (namely, at a position closer to the top of the page) than the images associated with the business accounts of the other genres. This allows the user to find a desired facility of a desired genre more easily.

The display processing unit 212 may display the one or more images extracted by the search processing unit 211 collectively for each facility corresponding to the business account. For example, when a switch key SW4 included in the display setting page P2 shown in FIG. 8 is set to ON, the display processing unit 212 displays, collectively for each facility corresponding to the business account: images associated with the business account; and images that were each photographed at a facility corresponding to the business account and are associated with the personal account. For example, in the search result page P1 shown in FIG. 9, the images Ga1 and Ga2 are images associated with the business account of a restaurant C (for example, image B shown in FIG. 3), and the images Ga3 to Ga6 are images related to the restaurant C (for example, image D shown in FIG. 3) among the images associated with the personal account. In addition, the image Gb1 is an image associated with the business account of a restaurant F, and the images Gb2 to Gb5 are images associated with the restaurant F among the images associated with the personal account. In addition, the image Gc1 is an image associated with the business account of restaurant H. This allows the user to browse a plurality of images related to a same facility collectively regardless of whether the images are associated with the business account or the personal account. As a result, this allows the user to find a desired facility more easily.

In a case where the number of images related to a same facility exceeds a predetermined upper limit number, the display processing unit 212 may initially display only the upper limit number of images in the search result page P1 among the images related to the same facility, and display, in the search result page P1, an expansion operation key that is operated to display the remaining images. Subsequently, in response to an operation of the expansion operation key, the display processing unit 212 may display the remaining images in the search result page P1. In this case, the display processing unit 212 may initially display images associated with the business account in the search result page P1 among the images related to the facility in preference to the other images.

The display processing unit 212 may display, among a plurality of images collected for each facility, images associated with the business account in preference to images associated with the personal account. For example, as in the search result page P1 shown in FIG. 9, the display processing unit 212 may display, among images Ga1 to Ga6 related to the restaurant C, images Ga1 and Ga2 associated with the business account at a higher position (namely, at a position closer to the top of the search result page P1) than images Ga3 to Ga6 associated with the personal account. Similarly, the display processing unit 212 may display, among images Gb1 to Gb5 related to the restaurant F, an image Gb1 associated with the business account at a higher position (namely, at a position closer to the top of the search result page P1) than images Gb2 to Gb5 associated with the personal account. This allows the user to easily find images associated with the business account from a plurality of images collected for each facility.

The display processing unit 212 may display the one or more images extracted by the search processing unit 211 collectively for each facility corresponding to the business account in an order according to the distance from a location to the facility, wherein the location is indicated by position information that is input. For example, when a switch key SW6 included in the display setting page P2 shown in FIG. 8 is set to ON, the display processing unit 212 displays, collectively for each facility corresponding to the business account, the one or more images extracted by the search processing unit 211 in an order of shorter distance from a location specified by the user, to the facility. With this configuration, images are displayed in an order starting with an image of a facility closest to the location indicated by the position information. This allows the user to easily find a desired facility from facilities closer to the location indicated by the position information. It is noted that the position information may indicate the current position of the user terminal 3, or indicate a location specified by the user.

The display processing unit 212 may display the one or more images extracted by the search processing unit 211 in a display mode where each collection of images related to a same facility can be visually confirmed. For example, when a switch key SW5 included in the display setting page P2 shown in FIG. 8 is set to ON, the display processing unit 212 surrounds a plurality of images related to a same facility by a frame line so that the collection of the images related to the same facility can be visually confirmed. For example, in the search result page P1 shown in FIG. 9, images Ga1 to Ga6 related to the restaurant C are surrounded by a frame line L1 and images Gb1 to Gb5 related to the restaurant F are surrounded by a frame line L2. This allows the user to easily recognize images related to a same facility. It is noted that as another embodiment, the display processing unit 212 may assign a different color of contour line of image or a different background color of image to each facility so that each collection of images related to a same facility can be visually confirmed.

[User Terminal 3]

As shown in FIG. 3, each of the user terminals 3 includes a control unit 31, a storage unit 32, an operation/display unit 33, a communication interface 34, a GPS (Global Positioning System) sensor 35, and a camera 36. The user terminal 3 is an information processing apparatus such as a mobile phone, a smartphone, a tablet terminal, or a personal computer.

The communication interface 34 connects the user terminal 3 to the communication network N1 through a wire or wirelessly, and performs a data communication with external devices such as the image search apparatus 2 via the communication network N1 in accordance with a predetermined communication protocol.

The operation/display unit 33 is a user interface including a display unit and an operation unit, wherein the display unit is, for example, a liquid crystal display or an organic EL display that displays various types of information such as messages and web pages, and the operation unit is, for example, a mouse, a keyboard, hard keys, or a touch panel that receives operations.

The storage unit 32 is a nonvolatile storage unit, such as a flash memory, for storing various types of information. For example, the storage unit 32 stores control programs such as an image sharing program. The image sharing program is a control program for causing the control unit 31 to execute a process of uploading (posting) an image to the image search apparatus 2, and a process of browsing images that have been uploaded to the image search apparatus 2. It is noted that as another embodiment, a browser program may be used in place of the image sharing program, as the control program for causing the control unit 31 to execute a process of uploading (posting) an image to the image search apparatus 2, and a process of browsing images that have been uploaded to the image search apparatus 2. The browser program is a control program for causing the control unit 31 to execute a process of communicating with an external apparatus such as the image search apparatus 2 in accordance with a communication protocol such as HTTP (Hypertext Transfer Protocol).

The control unit 31 includes control equipment such as a CPU, a ROM, and a RAM. The CPU is a processor that executes various calculation processes. The ROM is a nonvolatile storage unit in which control programs, such as a BIOS and an OS, for causing the CPU to execute the various calculation processes are stored in advance. The RAM is a volatile or nonvolatile storage unit for storing various types of information, and is used as a temporary storage memory (working area) for the various types of processes executed by the CPU. The control unit 31 controls the user terminal 3 by causing the CPU to execute the various types of control programs that have been stored in the ROM or the storage unit 32 in advance.

The GPS sensor 35 acquires GPS information that includes latitude information and longitude information and indicates the current position of the user terminal 3 based on a signal from a GPS satellite.

The camera 36 includes a lens and an imaging element, and outputs image data corresponding to light incident on the imaging element. The image data output from the camera 36 is converted into image data of a JPEG format, and recorded on the storage unit 32. It is noted that GPS information (longitude, latitude, and altitude) that is acquired by the GPS sensor 35 during photographing, may be embedded as metadata in the image data.

[Upload Process]

The following describes an upload process executed by the control unit 21 of the image search apparatus 2, with reference to FIG. 5. It is noted that the control unit 21 executes the upload process individually for a user terminal 3 when the image search apparatus 2 is accessed from the user terminal 3 (when an upload request is received from the user terminal 3). That is, the control unit 21 may execute a plurality of upload processes respectively for a plurality of user terminals 3 approximately in parallel with each other by time division. In addition, the upload process may be ended halfway when a predetermined operation is performed on the user terminal 3.

<Step S11>

First, in step S11, the control unit 21 executes a login process. Specifically, the control unit 21 receives a user ID and a password from the user terminal 3 via the communication network N1. Subsequently, the control unit 21 determines whether or not the combination of the user ID and the password received from the user terminal 3 is registered in the user account information D1 (see FIG. 2). When it is determined that the combination of the user ID and the password is registered in the user account information D1, the process moves to step S12. On the other hand, when it is determined that the combination of the user ID and the password is not registered in the user account information D1, the upload process ends.

<Step S12>

In step S12, the control unit 21 receives an image, tag information, and position information from the user terminal 3 via the communication network N1. It is noted that the tag information and the position information may be omitted.

<Step S13>

In step S13, the control unit 21 stores the image received in the step S12, into the storage unit 22.

<Step S14>

In step S14, the control unit 21 updates the image information D2 (see FIG. 3) based on the user ID received in the step S11, and the image, the tag information, and the position information received in the step S12. This allows the image stored in the storage unit 22 in the step S13 to be associated with the user ID, the tag information, and the position information. This ends the upload process.

As a result of the upload process, the image uploaded (posted) from the user terminal 3 is stored in the storage unit 22 in a state where the image is associated with either of the two types of user accounts: the personal account; or the business account.

[Image Search Process]

The following describes an image search process executed by the control unit 21 of the image search apparatus 2, with reference to FIG. 6. It is noted that the control unit 21 executes the image search process individually for a user terminal 3 when the image search apparatus 2 is accessed from the user terminal 3 (when an image search request is received from the user terminal 3). That is, the control unit 21 may execute a plurality of image search processes respectively for a plurality of user terminals 3 approximately in parallel with each other by time division. In addition, the image search process may be ended halfway when a predetermined operation is performed on the user terminal 3.

It is noted that the present disclosure can be considered as an invention of an image search method that executes one or more steps included in the image search process, wherein one or more steps included in the image search process described here may be omitted appropriately. It is noted that the steps of the image search process may be executed in different orders as far as similar actions and effects are produced. The following describes an example where the control unit 21 executes the steps of the image search process. However, as another embodiment, the steps of the image search process may be distributedly executed by a plurality of processors.

<Step S21>

First, in step S21, the control unit 21 receives a search condition for searching for an image(s) from a user terminal 3 via the communication network N1. For example, the control unit 21 displays a search condition input page (not shown) for inputting the search condition on the operation/display unit 33 of the user terminal 3. Subsequently, the control unit 21 receives a search condition that is input on the search condition input page by the user of the user terminal 3, from the user terminal 3 via the communication network N1. The search condition includes a search keyword that is composed of a character string input by the user.

<Step S22>

In step S22, the control unit 21 extracts one or more images that meet the search condition received in the step S21, from a plurality of images stored in the storage unit 22 (namely, a plurality of images uploaded from the plurality of user terminals 3). Specifically, the control unit 21 compares the search keyword acquired in the step S21 with the tag information included in the image information D2 (see FIG. 3), and extracts one or more images attached with a hash tag that matches the search keyword. The process of the step S22 is executed by the search processing unit 211 of the control unit 21. The step S22 is an example of a search step of the present disclosure.

It is noted that as another embodiment, the control unit 21 may extract one or more images associated with position information that includes a character string indicated by the search keyword, from the plurality of images stored in the storage unit 22. In addition, the control unit 21 may extract one or more images associated with a user ID that includes a character string indicated by the search keyword, from the plurality of images stored in the storage unit 22.

<Step S23>

In step S23, the control unit 21 overlays the business account indicator image B1 on an image(s) associated with the business account, among the one or more images extracted in the step S22. It is noted that when position information included in a piece of image information D2 corresponding to an image matches an address included in a piece of business profile information D3 corresponding to the business account, the business account indicator image B1 may be overlaid on the image.

<Step S24>

In step S24, the control unit 21 displays the search result page P1 that includes the one or more images extracted in the step S22, on the operation/display unit 33 of the user terminal 3. Specifically, the control unit 21 transmits data of the search result page P1 shown in FIG. 7 to the user terminal 3 via the communication network N1. This allows the search result page P1 to be displayed on the operation/display unit 33 of the user terminal 3. The one or more images extracted in the step S22 are displayed in the search result page P1. In addition, among the one or more images displayed in the search result page P1, images associated with the business account are displayed with the business account indicator image B1 overlaid thereon. The process of the step S24 is executed by the display processing unit 212 of the control unit 21. The step S24 is an example of a display step of the present disclosure.

<Step S25>

In step S25, the control unit 21 determines whether or not the display setting has been changed. Specifically, when the display setting key K11 included in the search result page P1 is operated, the control unit 21 displays the display setting page P2 shown in FIG. 8, on the operation/display unit 33 of the user terminal 3. Subsequently, when any one of the switch keys SW1 to SW6 included in the display setting page P2 is operated, the control unit 21 determines that the display setting has been changed. When it is determined that the display setting has been changed (S25: Yes), the process moves to step S26. On the other hand, when it is determined that the display setting has not been changed (S25: No), the process moves to step S27.

<Step S26>

In step S26, the control unit 21 updates the search result page P1. Specifically, the control unit 21 updates the search result page P1 in accordance with a user operation performed on the display setting page P2, and displays the updated search result page P1 on the operation/display unit 33 of the user terminal 3. The process of the step S26 is executed by the display processing unit 212 of the control unit 21.

For example, when the switch key SW1 included in the display setting page P2 is changed from ON to OFF, the control unit 21 hides the business account indicator image B1 in the search result page P1. On the other hand, when the switch key SW1 included in the display setting page P2 is changed from OFF to ON, the control unit 21 displays the business account indicator image B1 in the search result page P1. As a result, the business account indicator image B1 is overlaid on the images associated with the business account.

In addition, when the switch key SW2 included in the display setting page P2 is changed from OFF to ON, the control unit 21 hides the images associated with the personal account in the search result page P1. As a result, only the images associated with the business account are displayed in the search result page P1. On the other hand, when the switch key SW2 included in the display setting page P2 is changed from ON to OFF, the control unit 21 displays the images associated with the personal account in the search result page P1. As a result, the images associated with the personal account are displayed in the search result page P1, as well as the images associated with the business account.

In addition, when the switch key SW3 included in the display setting page P2 is changed from OFF to ON, the control unit 21 hides the images associated with the personal account in the search result page P1, and also hides images associated with the business account of genres other than the restaurant genre. As a result, only images associated with the business account of the restaurant genre are displayed in the search result page P1. On the other hand, when the switch key SW3 included in the display setting page P2 is changed from ON to OFF, the control unit 21 displays the images associated with the personal account and the images associated with the business account of genres other than the restaurant genre in the search result page P1. As a result, the images associated with the personal account and the images associated with the business account of genres other than the restaurant genre are displayed in the search result page P1, as well as the images associated with the business account of the restaurant genre.

In addition, when the switch key SW4 included in the display setting page P2 is changed from OFF to ON, the control unit 21 rearranges the images to be displayed in the search result page P1 such that the images are displayed collectively in the search result page P1 for each facility corresponding to the business account. As a result, in the search result page P1, the images are displayed collectively for each facility corresponding to the business account. On the other hand, when the switch key SW4 included in the display setting page P2 is changed from ON to OFF, the control unit 21 rearranges the images to be displayed in the search result page P1 in a predetermined order (for example, in an order of later dates/times of uploading). As a result, in the search result page P1, the images are displayed in a state of being arranged in the predetermined order.

Figure 9:
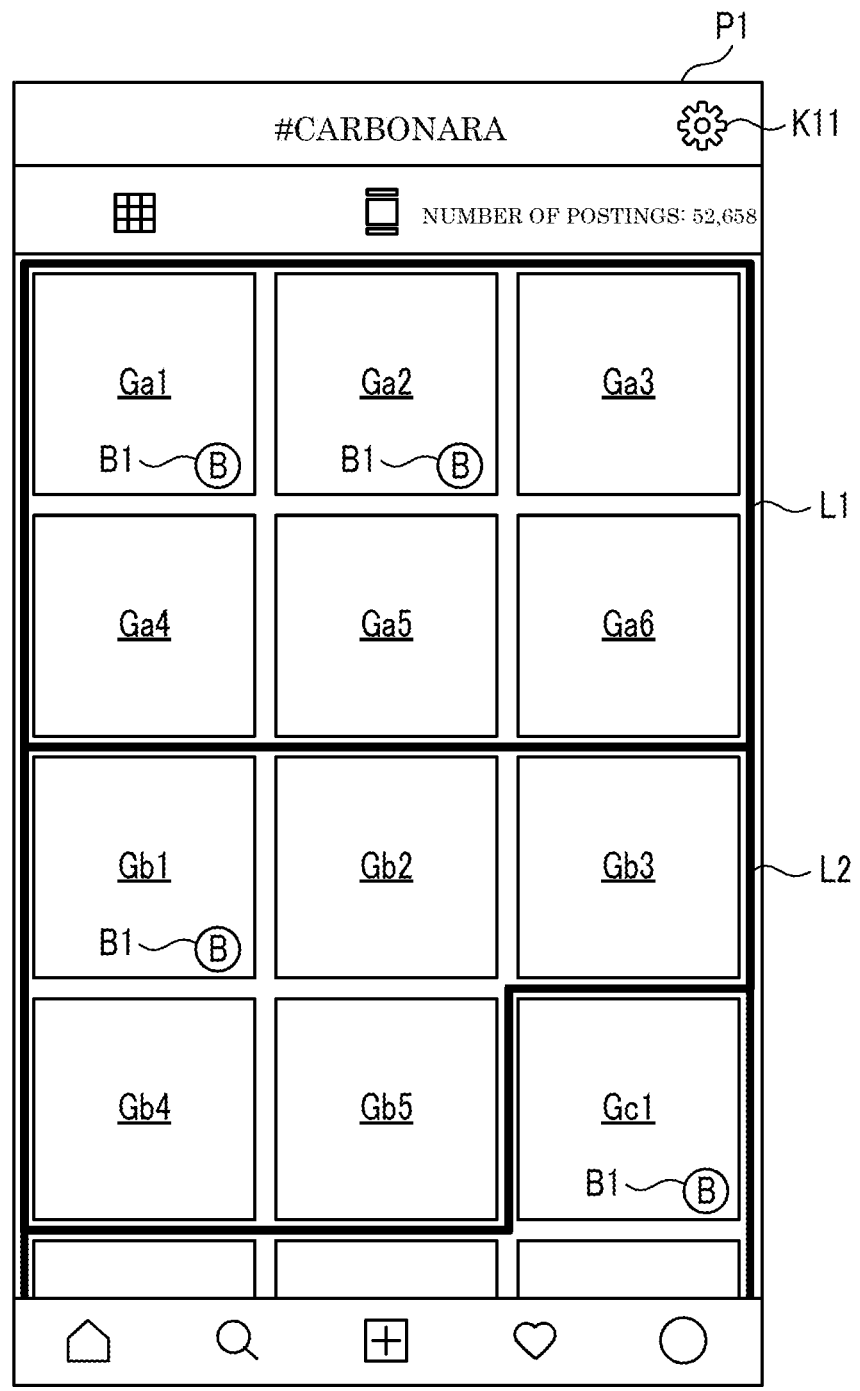
FIG. 9 is a diagram showing an example of the search result page displayed on the user terminal in the image search system according to the embodiment of the present disclosure.

In addition, when the switch key SW5 included in the display setting page P2 is changed from OFF to ON, the control unit 21, in the search result page P1, surrounds images related to a same facility by a frame line (e.g., the frame line L1 and the frame line L2 shown in FIG. 9). On the other hand, when the switch key SW5 included in the display setting page P2 is changed from ON to OFF, the control unit 21 hides the frame line.

In addition, when the switch key SW6 included in the display setting page P2 is changed from OFF to ON, the control unit 21, for example, displays a location setting page (not shown) on the operation/display unit 33 of the user terminal 3, and urges the user to specify a location. On the location setting page, the user can specify the current position of the user terminal 3 or another location. In a case where the user specifies the current position of the user terminal 3 on the location setting page, the control unit 21 receives the GPS information detected by the GPS sensor 35 of the user terminal 3, from the user terminal 3 via the communication network N1. After a location is specified by the user on the location setting page, the control unit 21 rearranges the images to be displayed in the search result page P1 in an order of shorter distance from the location to a facility associated with any one of the images, and displays the rearranged images in the search result page P1. It is noted that the distance from the location to a facility associated with any one of the images is, for example, calculated based on the address included in the business profile information D3. On the other hand, when the switch key SW6 included in the display setting page P2 is changed from ON to OFF, the control unit 21 rearranges the images to be displayed in the search result page P1 in a predetermined order (for example, in an order of later dates/times of uploading), and displays the rearranged images in the search result page P1. As a result, the images rearranged in the predetermined order are displayed in the search result page P1.

<Step S27>

In step S27, the control unit 21 determines whether or not an image included in the search result page P1 has been operated. For example, when an image included in the search result page P1 has been tapped, the control unit 21 determines that an image included in the search result page P1 has been operated. When it is determined that an image included in the search result page P1 has been operated (S27: Yes), the process moves to step S28. On the other hand, when it is determined that any of the images included in the search result page P1 has not been operated (S27: No), the process moves to step S29.

It is noted that as another embodiment, when an image included in the search result page P1 is operated (for example, tapped), the control unit 21 may enlarge the operated image. In addition, when the enlarged image is further operated (for example, further tapped), the process may move to step S28. It is noted that in a case where the enlarged image is an image associated with the business account, the business account indicator image B1 may or may not be overlaid on the enlarged image. In addition, the business account indicator image B1 may not be overlaid on the image (image associated with the business account) before the enlargement, and the business account indicator image B1 may be overlaid only on the enlarged image (image associated with the business account).

<Step S28>

In step S28, the control unit 21 displays, on the operation/display unit 33 of the user terminal 3, a profile page P3 corresponding to the operated image. Specifically, the control unit 21 transmits data of, for example, the profile page P3 shown in FIG. 10 to the user terminal 3 via the communication network N1. As a result, the profile page P3 is displayed on the operation/display unit 33 of the user terminal 3. The profile page P3 is generated for each of the user accounts. For example, a user ID of a corresponding user account and an image associated with the user account are displayed on the profile page P3.

Figure 10:
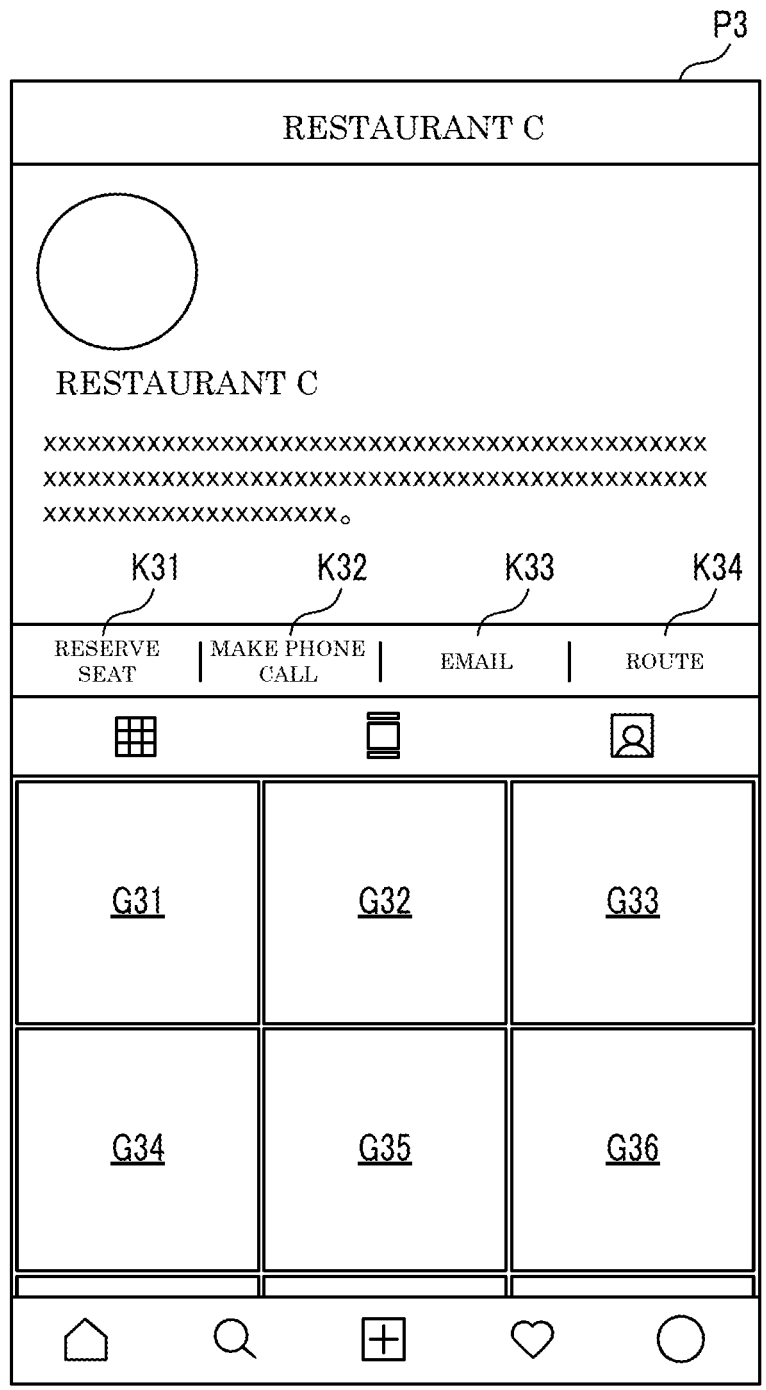
FIG. 10 is a diagram showing an example of a profile page displayed on the user terminal in the image search system according to the embodiment of the present disclosure.

FIG. 10 shows a profile page P3 that corresponds to a business account of restaurant C. As shown in FIG. 10, a profile page P3 corresponding to a business account of restaurant genre may include at least one of a reservation key K31, a telephone key K32, an email key K33, and a route key K34.

The reservation key K31 is an operation key for reserving a facility corresponding to the business account. When the reservation key K31 is operated, the control unit 21 transmits information of a reservation page included in the business profile information D3, to the user terminal 3. The control unit 31 of the user terminal 3 displays a reservation page on the operation/display unit 33 based on the information of the reservation page so that the user can make a reservation of the facility on the reservation page.

The telephone key K32 is an operation key for making a phone call to a facility corresponding to the business account. When the telephone key K32 is operated, the control unit 21 transmits information of a telephone number included in the business profile information D3 to the user terminal 3. The control unit 31 of the user terminal 3 makes a phone call to the facility based on the information of the telephone number.

The email key K33 is an operation key for sending an email to a facility corresponding to the business account. When the email key K33 is operated, the control unit 21 transmits information of an email address included in the business profile information D3 to the user terminal 3. The control unit 31 of the user terminal 3 displays an email creation screen on the operation/display unit 33 based on the information of the email address so that on the email creation screen, the user can create an email addressed to the facility.

The route key K34 is an operation key for showing a route to a facility corresponding to the business account. When the route key K34 is operated, the control unit 21 transmits information of an address included in the business profile information D3 to the user terminal 3. The control unit 31 of the user terminal 3 displays a map on the operation/display unit 33 based on the information of the address, wherein the map shows a route from the current position of the user terminal 3 to the address of the facility.

<Step S29>

In step S29, the control unit 21 determines whether or not to end the image search process. For example, when a predetermined end operation is performed, the control unit 21 may determine to end the image search process. Alternatively, when any one of the reservation key K31, the telephone key K32, the email key K33, and the route key K34 included in the profile page P3 is operated, the control unit 21 may determine to end the image search process. When the control unit 21 determines to end the image search process (S29: Yes), the image search process is ended. On the other hand, when the control unit 21 determines not to end the image search process (S29: No), the process returns to the step S25.

As described above, according to the image search apparatus 2 of the present embodiment, the business account indicator image B1 is overlaid on, among images meeting a search condition, images associated with the business account. As a result, according to the image search apparatus 2 of the present embodiment, the user browsing the search result page P1 can easily distinguish between images associated with the personal account (e.g., images photographed at restaurants by general users) and images associated with the business account (e.g., images uploaded by restaurants).

In addition, the image search apparatus 2 of the present embodiment can display images that meet a search condition, collectively for each facility related to the images. As a result, according to the image search apparatus 2 of the present embodiment, the user can recognize a plurality of images related to a same facility collectively regardless of whether the images are associated with the business account or the personal account. This allows the user to find a desired facility more easily.

In the above-described embodiment, in step S23, the business account indicator image B1 is overlaid on images associated with the business account. However, the present disclosure is not limited to the configuration. As another embodiment, when an image is uploaded from a user terminal 3 to the image search apparatus 2, the business account indicator image B1 may be overlaid on the image. In this case, for example, the image sharing program executed by the control unit 31 of the user terminal 3 may include an instruction code instructing to overlay the business account indicator image B1 on the image.

Meanwhile, as another embodiment, when, in step S22, the control unit 21 extracts one or more images that meet the search condition received in the step S21 from the plurality of images stored in the storage unit 22, the control unit 21 may extract only images that correspond to facilities that can be reserved online (on web). For example, in the business profile information D3, the reservation web page information may be registered only with regard to facilities that can be reserved online, and the reservation web page information may not be registered with regard to facilities that cannot be reserved online. In this case, if the reservation web page information is included in the business profile information D3 of the business account of a facility corresponding to the image, the control unit 21 determines that the facility can be reserved on line. It is noted that the business profile information D3 may include information that shows whether or not the online reservation is available. It is noted that when the control unit 21 extracts one or more images in step S22, the control unit 21 may switch, in accordance with a user operation, whether or not to extract only images that correspond to facilities that can be reserved online. Furthermore, in a case where the image search apparatus 2 has a function to manage vacant seats in each facility, the control unit 21 may extract only images that correspond to facilities that can be reserved for the current date/rime, or only images that correspond to facilities that can be reserved for a specified date/time.

Furthermore, as shown in FIG. 7, when a facility corresponding to the image can be reserved from the reservation web page, the control unit 21 may overlay, as the business account indicator image B1, a first indicator image such as a character "R" surrounded by a circle representing "reservation", to indicate that the web reservation is available, and when a facility corresponding to the image cannot be reserved from the reservation web page, the control unit 21 may overlay, as the business account indicator image B1, a second indicator image such as a character "B" surrounded by a circle representing "business". That is, the control unit 21 may switch between different business account indicator images B1 depending on whether a facility corresponding to the image can be reserved from the reservation web page so that the business account indicator image B1 indicates whether a facility corresponding to the image can be reserved online. This allows the user to easily recognize, by seeing the business account indicator image B1, whether or not a facility can be reserved.

It is noted that when a facility can be reserved from the reservation web page, both the first indicator image and the second indicator image may be displayed as different business account indicator images B1. Furthermore, in a case where the image search apparatus 2 has a function to manage vacant seats in each facility, the control unit 21 may overlay an image indicating that the reservation is available, on only images that correspond to facilities that can be reserved for the current date/time, or on only images that correspond to facilities that can be reserved for a specified date/time.

Furthermore, when the first indicator image displayed as the business account indicator image B1 is operated, the control unit 21 may display the reservation web page of a facility that corresponds to an image on which the first indicator image is overlaid. This makes it possible to urge the user to make a reservation for a facility when the facility can be reserved from the reservation web page. For example, in the reservation web page displayed on the user terminal 3, the control unit 21 can search for or display the date or date/time for which a reservation can be made, and can receive, from the user terminal 3, a request to make a reservation for a displayed date or date/time. In addition, the reservation web page may be a web page of a site stored in an external server managed by a business that corresponds to the business account.

The embodiment describes an example where, as shown in at least FIG. 7, the business account indicator image B1 is a character "B" surrounded by a circle representing "business". However, as another embodiment, the business account indicator image B1 may be one or more characters. In addition, the business account indicator image B1 may be a mark or the like that does not include a character.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

What is claimed is:

1. An image search apparatus comprising:
one or more processors configured to execute:
a search processing module to extract one or more extracted images that meet a search condition, from a plurality of images associated with user accounts; and
a display processing module to display the one or more extracted images in such a manner that types of user accounts corresponding to the one or more extracted images are visually distinguished, wherein
the display processing module is configured to display, the one or more extracted images in alignment, and overlay one or more predetermined indicator images the one or more extracted images, respectively, such that each respective extracted image of the one or more extracted images is overlaid with a respective predetermined indicator image which corresponds to a predetermined specific type of a user account associated with the respective extracted image;
each of the respective predetermined indicator images is at least one of a first predetermined indicator image or a second predetermined indicator image;
each of the predetermined specific types is at least one of a first-type user account type or a second-type user account type;
the display processing module is configured to overlay the first predetermined indicator image that corresponds to the first-type user account type on each of the one or more extracted images that are associated with the first-type user account type, and overlay the second predetermined indicator image that corresponds to the second-type user account type on each of the one or more extracted images that are associated with the second-type user account type;
the first predetermined indicator image is different from the second predetermined indicator image;
the first-type user account type is different from the second-type user account type; and
the first-type user account type is a personal account type, and the second-type user account type is a business account type.

2. The image search apparatus according to claim 1, wherein
each of the respective predetermined indicator images overlaid by the display processing module indicates whether or not a facility of the user account of the specific type can be reserved online.

3. The image search apparatus according to claim 1, wherein
the display processing module is configured to switch a mode of displaying the respective predetermined indicator image associated with the predetermined specific type of the user account between a first display mode and a second display mode in accordance with a user input, and in the first display mode, the respective predetermined indicator image is overlaid on the respective extracted image, and in the second display mode, the respective predetermined indicator image is not overlaid on the respective extracted image.

4. The image search apparatus according to claim 1, wherein
the display processing module is configured to display information concerning the user account corresponding to the respective extracted image on which the respective predetermined indicator image is overlaid, in accordance with a predetermined operation performed on the respective predetermined indicator image.

5. The image search apparatus according to claim 1, wherein
the search processing module is configured to extract only one or more images that meet the search condition and correspond to one or more facilities that can be reserved online, as the one or more extracted images.

6. The image search apparatus according to claim 5, wherein
the search processing module is configured to switch, in accordance with a user operation, whether or not to extract only the one or more images that correspond to the one or more facilities that can be reserved online.

7. The image search apparatus according to claim 1, wherein
the display processing module is configured to display the second predetermined indicator image associated with the second-type user account type in preference to the first predetermined indicator image associated with the first-type user account type.

8. The image search apparatus according to claim 1, wherein
the display processing module is configured to display the second predetermined indicator image associated with the second-type user account type in such a manner that a genre of the second-type user account type is visually distinguished.

9. The image search apparatus according to claim 8, wherein
the display processing module is configured to display one or more images associated with the second-type user account type of a predetermined specific genre in preference to one or more images associated with the second-type user account type of genres other than the specific genre.

10. The image search apparatus according to claim 1, wherein
the display processing module is configured to display the one or more extracted images collectively for each facility corresponding to the second-type user account type, so that the one or more extracted images corresponding to the second-type user account type are displayed grouped together by facility.

11. The image search apparatus according to claim 10, wherein
the display processing module is configured to display, collectively for each facility corresponding to the second-type user account type:
images associated with the second-type user account type; and
images that were each photographed at a facility corresponding to the second-type user account type and are associated with the first-type user account type.

12. The image search apparatus according to claim 10, wherein the display processing module is configured to display, among a plurality of images collected for each facility, the second predetermined indicator image associated with the second-type user account type in preference to the first predetermined indicator image associated with the first-type user account type, so that the one or more extracted images corresponding to the second-type user account type are displayed grouped together by facility.

13. The image search apparatus according to claim 10, wherein
the display processing module is configured to display the one or more extracted images collectively for each facility corresponding to the second-type user account type in an order according to a distance from a location to a facility, so that the one or more extracted images corresponding to the second-type user account type are displayed grouped together by facility, the location being indicated by position information that is input.

14. The image search apparatus according to claim 10, wherein
the display processing module is configured to display the one or more extracted images collectively for each facility in a display mode where each collection of images related to a same facility are visually distinguished, so that the one or more extracted images corresponding to the second-type user account type are displayed grouped together by facility.

15. A non-transitory computer-readable recording medium in which is recorded an image search program that causes one or more processors to execute:
a search step of extracting one or more extracted images that meet a search condition, from a plurality of images associated with user accounts; and
a display step of displaying the one or more extracted images in such a manner that types of user accounts corresponding to the one or more extracted images are visually distinguished, wherein
the one or more extracted images are displayed in alignment and one or more predetermined indicator images are overlaid on the one or more extracted images, respectively, such that each respective extracted image of the one or more extracted images is overlaid with a respective predetermined indicator image, which corresponds to a predetermined specific type of a user account associated with the respective extracted image;
each of the respective predetermined indicator images is at least one of a first predetermined indicator image or a second predetermined indicator image;
each of the predetermined specific types is at least one of a first-type user account type or a second-type user account type;
the first predetermined indicator image that corresponds to the first-type user account type is overlaid on each of the one or more extracted images that are associated with the first-type user account type, and the second predetermined indicator image that corresponds to the second-type user account type is overlaid on each of the one or more extracted images that are associated with the second-type user account type;
the first predetermined indicator image is different from the second predetermined indicator image;
the first-type user account type is different from the second-type user account type; and
the first-type user account type is a personal account type, and the second-type user account type is a business account type.

16. An image search method that causes one or more processors to execute:
a search step of extracting one or more extracted images that meet a search condition, from a plurality of images associated with user accounts; and
a display step of displaying the one or more extracted images in such a manner that types of user accounts corresponding to the one or more extracted images are visually distinguished, wherein
the one or more extracted images are displayed in alignment;
one or more predetermined indicator images are overlaid on, the one or more extracted images, respectively, such that each respective extracted image of the one or more extracted images is overlaid with a respective predetermined indicator image, among the one or more predetermined indicator images, which corresponds to a predetermined specific type of a user account associated with the respective extracted image;
each of the respective predetermined indicator images is at least one of a first predetermined indicator image or a second predetermined indicator image;
each of the predetermined specific types is at least one of a first-type user account type or a second-type user account type;
the first predetermined indicator image that corresponds to the first-type user account type is overlaid on each of the one or more extracted images that are associated with the first-type user account type, and the second predetermined indicator image that corresponds to the second-type user account type is overlaid on each of the one or more extracted images that are associated with the second-type user account type;
the first predetermined indicator image is different from the second predetermined indicator image;
the first-type user account type is different from the second-type user account type; and
the first-type user account type is a personal account type, and the second-type user account type is a business account type.

* * * * *